(12) United States Patent
Kinoshita et al.

(10) Patent No.: US 9,363,949 B2
(45) Date of Patent: Jun. 14, 2016

(54) GRIP FOR BACKPACK-TYPE AIR BLOWING MACHINE

(71) Applicant: Yamabiko Corporation, Tokyo (JP)

(72) Inventors: Yusuke Kinoshita, Tokyo (JP); Hiroki Mutoh, Tokyo (JP); Yoshihiro Yamauchi, Kanagawa (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 14/587,001

(22) Filed: Dec. 31, 2014

(65) Prior Publication Data

US 2015/0196181 A1    Jul. 16, 2015

(30) Foreign Application Priority Data

Jan. 16, 2014   (JP) ................................. 2014-006293

(51) Int. Cl.
| | | |
|---|---|---|
| *A45C 13/22* | (2006.01) | |
| *B25G 1/04* | (2006.01) | |
| *A01G 1/12* | (2006.01) | |

(52) U.S. Cl.
CPC . *A01G 1/125* (2013.01); *Y10T 16/44* (2015.01)

(58) Field of Classification Search
CPC ............. A47L 5/14; A47L 9/32; A47L 9/322; A47L 9/325; A47L 9/327; A01B 1/026; A01D 34/90; A01D 34/902; B25G 1/10; B25G 1/102; B25G 1/002; B25G 3/00; B25G 3/02; B25G 3/04; B25F 5/006; B25F 5/026; E01H 5/02; E01H 1/0809; Y10T 16/469; Y10T 16/476; Y10T 16/473; Y10T 16/4713
See application file for complete search history.

(56) References Cited

U.S. PATENT DOCUMENTS

| | | | | | |
|---|---|---|---|---|---|
| 2,244,585 | A | * | 6/1941 | Tweit | A01B 1/00 15/143.1 |
| 2,361,417 | A | * | 10/1944 | Reichart | B25B 1/205 220/758 |
| 2,378,867 | A | * | 6/1945 | Reichart | A47J 45/077 220/758 |
| 4,155,582 | A | * | 5/1979 | Reisner | A01B 1/22 294/58 |
| 4,223,419 | A | * | 9/1980 | Sato | E01H 1/0809 15/327.5 |
| 4,794,667 | A | * | 1/1989 | Nelson | B25G 1/00 16/426 |
| 5,083,340 | A | * | 1/1992 | Takahashi | A47L 9/02 15/405 |
| 5,499,852 | A | * | 3/1996 | Seigendall | A01B 1/026 294/54.5 |
| 5,661,960 | A | * | 9/1997 | Smith | A01D 34/902 30/276 |
| 5,713,191 | A | * | 2/1998 | Welton | A01D 34/416 30/276 |
| 5,794,307 | A | * | 8/1998 | Overcash | B62B 1/18 16/427 |

(Continued)

*Primary Examiner* — Chuck Mah
(74) *Attorney, Agent, or Firm* — Kilyk & Bowersox, P.L.L.C.

(57) ABSTRACT

A grip for a backpack-type air blowing machine which performs a work by using air discharged from a distal end of an air blowing pipe that is coupled to a blower body driven by a power source while the air blowing pipe is manipulated by an operator with the power source and the blower body being carried on a back of the operator. The grip comprises a base section that constitutes an attachment section to the air blowing pipe, a vertical grip section that is provided with a proximal end portion provided continuously to the base section, and that extends in a direction away from the air blowing pipe, and a lateral grip section that extends backward along the air blowing pipe from a free end of the vertical grip section. The lateral grip section is located adjacent to a back of a hand of the operator holding the air blowing pipe.

10 Claims, 9 Drawing Sheets

(56) References Cited

U.S. PATENT DOCUMENTS

| | | | |
|---|---|---|---|
| 6,105,206 A | 8/2000 | Tokumaru et al. | |
| 6,260,732 B1 * | 7/2001 | Khodush | B65D 25/2811 220/737 |
| 6,485,076 B1 * | 11/2002 | Chang | A01B 1/026 254/131.5 |
| 6,865,779 B2 * | 3/2005 | Gillanders | B25H 1/0021 16/422 |
| 6,904,640 B2 * | 6/2005 | Jin | A47L 9/327 15/377 |
| 7,055,213 B2 | 6/2006 | Iida et al. | |
| 7,543,725 B2 | 6/2009 | Herzog | |
| 7,637,882 B2 * | 12/2009 | Carman, Jr. | A01B 1/00 16/422 |
| 7,971,914 B1 * | 7/2011 | Pladson | A01B 1/026 16/426 |
| 2003/0126749 A1 * | 7/2003 | Sanders | A01G 3/062 30/276 |
| 2006/0130273 A1 | 6/2006 | Norinder et al. | |
| 2007/0067947 A1 * | 3/2007 | Hittmann | B25F 5/026 15/405 |
| 2007/0214708 A1 * | 9/2007 | Millen | A01K 87/08 43/23 |
| 2008/0012368 A1 * | 1/2008 | Kent-Fawkes | A47G 23/0258 294/29 |
| 2008/0172826 A1 * | 7/2008 | Rappin | A01B 1/065 15/405 |
| 2010/0092232 A1 * | 4/2010 | Gallardo | B05C 17/00569 401/268 |
| 2012/0060322 A1 * | 3/2012 | Simonelli | A47L 9/009 15/411 |
| 2013/0269131 A1 * | 10/2013 | Mallett | A46B 5/00 15/144.1 |

* cited by examiner

GRIP FOR BACKPACK-TYPE AIR BLOWING MACHINE

CROSS-REFERENCE TO RELATED APPLICATION

The present application claims priority from Japanese Patent Application No. 2014-006293, filed Jan. 16, 2014, which is incorporated herein by reference.

FIELD OF THE INVENTION

The present invention relates to a backpack-type air blowing machine which is known as a power blower or a sprayer, and more specifically, to a grip which is detachably fitted to an air blowing pipe of the air blowing machine.

BACKGROUND OF THE INVENTION

A power blower has been known as a portable working machine that blows together fallen leaves, mowed grasses or the like. As one of application examples, a sprayer that sprays chemicals has been known. This type of working machine is roughly classified into a handheld type and a backpack type. Japanese Patent Laid-Open No. 2003-253638 discloses a typical example of a backpack-type air blowing machine. To describe the backpack-type air blowing machine in Japanese Patent Laid-Open No. 2003-253638, an operator performs a work while carrying a power source (engine) and a blower body driven by the power source on his back. To be more specific, an air blowing pipe is connected to the blower body via a bellows tube, and the air blowing pipe extends forward along the lateral side of the operator. When the air blowing machine is a power blower, the operator can blow together fallen leaves or the like by air discharged from the air blowing pipe by manipulating the air blowing pipe horizontally and vertically. When the air blowing machine is a sprayer, the operator sprays chemicals mixed into air that is discharged from the air blowing pipe by manipulating the air blowing pipe horizontally and vertically.

For manipulating the air blowing pipe, a grip that is grasped by the hand of the operator is provided with the air blowing pipe. The grip of the air blowing machine disclosed in Japanese Patent Laid-Open No. 2003-253638 has a linear shape extending upward from the air blowing pipe. Various proposals have been made regarding the grip.

Japanese Patent No. 4555282 proposes that a linear grip that extends upward is arranged laterally offset from the axis of an air blowing pipe.

U.S. Pat. No. 7,543,725 proposes to couple an air blowing pipe and the wrist of an operator. U.S. Pat. No. 6,105,206 discloses a pistol-type grip.

SUMMARY OF THE INVENTION

A conventional problem is described by reference to FIG. 18. Reference numeral 1 shown in FIG. 18 denotes a conventional backpack-type power blower. The well-known power blower 1 shown in FIG. 18 includes a blower body 4 that is driven by an engine 2, and an air blowing pipe 10 is coupled via a bellows tube 8 to a main pipe 6 that is connected to the blower body 4. The air blowing pipe 10 extends forward along the lateral side of an operator. Air is discharged from a distal end of the air blowing pipe 10.

A grip 12 is provided at a rear end portion of the air blowing pipe 10, namely, a proximal end portion proximal to the operator. The grip 12 is of the type described in Japanese Patent Laid-Open No. 2003-253638. The grip 12 has a linear shape extending upward from the axis of the air blowing pipe 10. The operator grasps the grip 12 to manipulate the air blowing pipe 10.

As the engine 2 mounted on the power blower 1, a plurality of types of engines of different displacements are employed, while the common grip 12 is normally employed. That is, the same grip 12 is employed for both the power blower 1 equipped with the engine 2 of a relatively small displacement, and the power blower 1 equipped with the engine 2 of a relatively large displacement. The grip 12 is detachably attached to the air blowing pipe 10. The grip 12 is fixed to a position suitable for each person according to the preference or the body size of the operator, and used. The operator performs a work by grasping the linear grip 12 in a state erected straight from the air blowing pipe 10.

It is preferable that an arm Ar is stretched along an axial line L1 of the air blowing pipe 10, and a hand H of the operator is in a handshaking state with the grip 12 as ideal positions of the arm and the hand for the operator. To the hand H of the operator grasping the grip 12, not only a first load for positioning the distal end of the air blowing pipe 10 at a desired position, but also a second load from the air blowing pipe 10 that is to be displaced outward is applied. The second load becomes larger as the displacement of the engine 2 is larger.

A forward-inclination angle θ of the grip 12 is preferably defined so as to obtain the above ideal positions. However, in actual circumstances, one type of grip 12 is applied to a plurality of types of power blowers 1 driven by the engines 2 of different displacements as described above. Accordingly, the above forward-inclination angle θ may not be ideal for a certain operator depending on the model of the power blower 1 or the body size of the operator in some cases.

The operator advances the work while displacing the distal end of the air blowing pipe 10 vertically and horizontally by grasping the grip 12. The second load is applied to the hand H grasping the grip 12 from the air blowing pipe 10 that is to be displaced laterally every time the output power of the engine 2 increases or decreases. The power or the second load becomes stronger as the displacement (output power) of the engine 2 is larger.

The operator starts the work after determining a relative position of the grip 12 with respect to the air blowing pipe 10 according to the body size (particularly, the height) of the operator, and fixing the grip 12 to the air blowing pipe 10. However, an arrangement range of the grip 12 is limited. Also, even when the position of the grip 12 is to be adjusted on each occasion that a change in fatigue or work environment occurs, it is troublesome to adjust the position of the grip 12. Accordingly, in actual circumstances, the operator changes the position of the hand grasping the grip 12 or the grasping strength so as to cope with the problem.

An object of the present invention is to provide a backpack-type air blowing machine and a grip capable of reducing the fatigue of an operator.

Another object of the present invention is to provide a backpack-type air blowing machine and a grip capable of increasing the degree of freedom of the form of grasping the grip.

Yet another object of the present invention is to provide a backpack-type air blowing machine and a grip capable of reducing the fatigue of an operator by the degree of freedom of the form of grasping the grip even when the common grip is applied to a plurality of types of backpack-type air blowing machines including drive sources of different output powers.

MEANS FOR SOLUTION OF THE PROBLEMS

In the present invention, the above technical objects are achieved by providing a grip for a backpack-type air blowing machine which performs a work by using air discharged from a distal end of an air blowing pipe that is coupled to a blower body driven by a power source while the air blowing pipe is manipulated by an operator with the power source and the blower body being carried on a back of the operator, comprising:

a base section that constitutes an attachment section to the air blowing pipe;

a vertical grip section that is provided with a proximal end portion provided continuously to the base section, and that extends in a direction away from the air blowing pipe; and a lateral grip section that extends backward along the air blowing pipe from a free end of the vertical grip section, wherein the lateral grip section is located adjacent to a back of a hand of the operator holding the air blowing pipe.

In a preferred embodiment of the present invention, the proximal end portion of the vertical grip section has a shape with a thickness capable of being sandwiched between a thumb and a forefinger of the operator, and the vertical grip section includes the proximal end portion, an upper portion above and thicker than the proximal end portion, and a step portion between the proximal end portion and the upper portion.

In accordance with the embodiment, an operator can manipulate the air blowing pipe by sandwiching the proximal end portion of the vertical grip section between the thumb and the forefinger in a state in which his palm is opposed to a peripheral surface of the air blowing pipe. Also, the step portion can prevent displacement of the thumb and the forefinger in a direction away from the air blowing pipe.

In a preferred embodiment of the present invention, the lateral grip section extends backward from the proximal end portion while being inclined outward when viewed in plan view. Accordingly, the operator easily accesses the air blowing pipe with his hand in a form in which the hand is in contact with the air blowing pipe.

Other objects and advantages of the present invention will become apparent from the detailed description of preferred embodiments given hereinafter.

DETAILED DESCRIPTION OF THE PRESENT INVENTION

In the following, preferred embodiments of the present invention are described based on the accompanying drawings.

Figure 18:
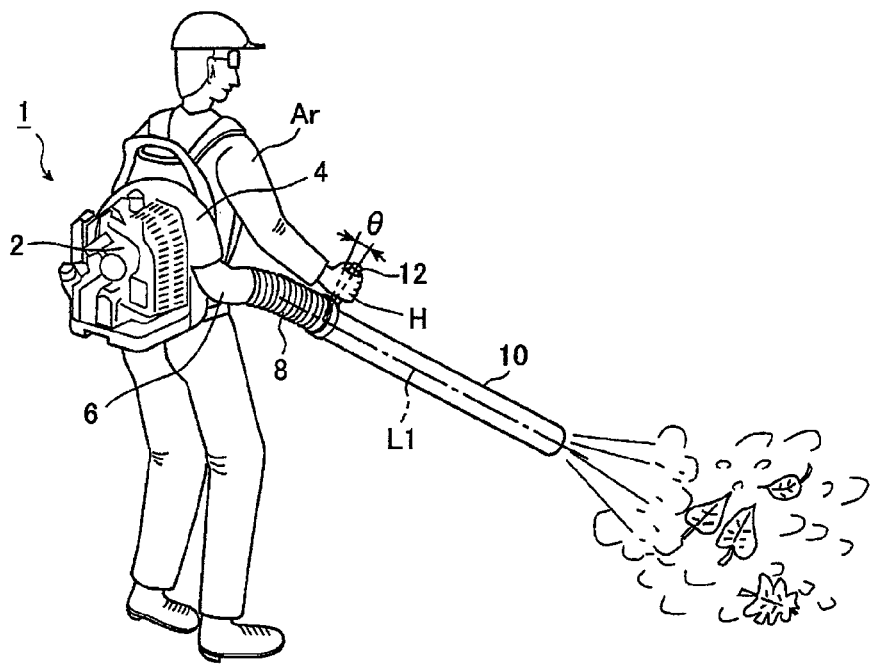
FIG. 18 shows a view for explaining a problem of a conventional typical grip.

First Embodiment (FIGS. 1 to 13):

FIGS. 1 to 7 show a grip 100 of a first embodiment. FIGS. 8 to 13 show a specific method for using the grip 100. The grip 100 is applicable to a backpack-type air blowing machine 1 described by reference to FIG. 18. That is, the grip 100 is applicable to a backpack-type power blower and a backpack-type sprayer. In the following description, the grip 100 of the embodiment is described in detail by assigning the same reference numerals to the members or elements described by reference to FIG. 18. In the following description, a "front" means the distal end side of an air blowing pipe 10. A "rear" means the side of a blower body 4. An "outward" means a direction away from an operator. An "inward" means a direction approaching an operator. A "right" and a "left" means respectively the right and the left as viewed from an operator during a work.

Figure 1:
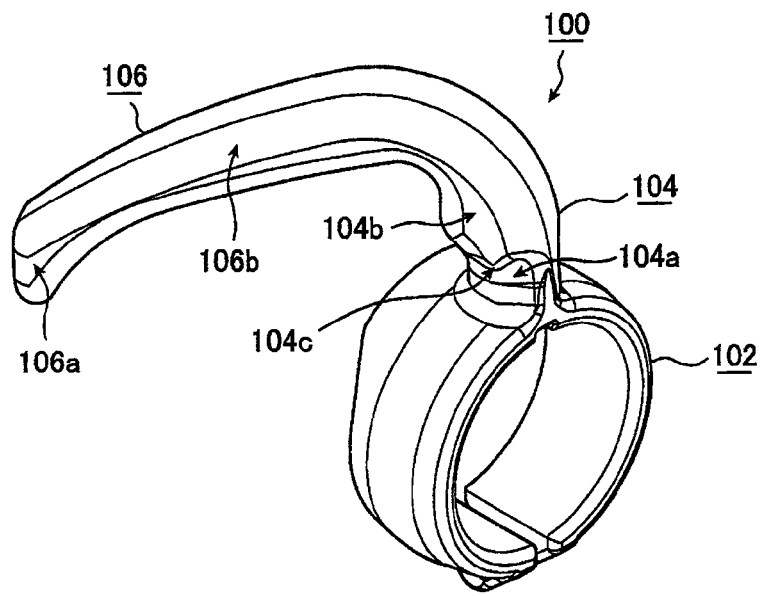
FIG. 1 shows a perspective view of a grip of a first embodiment as viewed from the diagonally front side.
Figure 2:
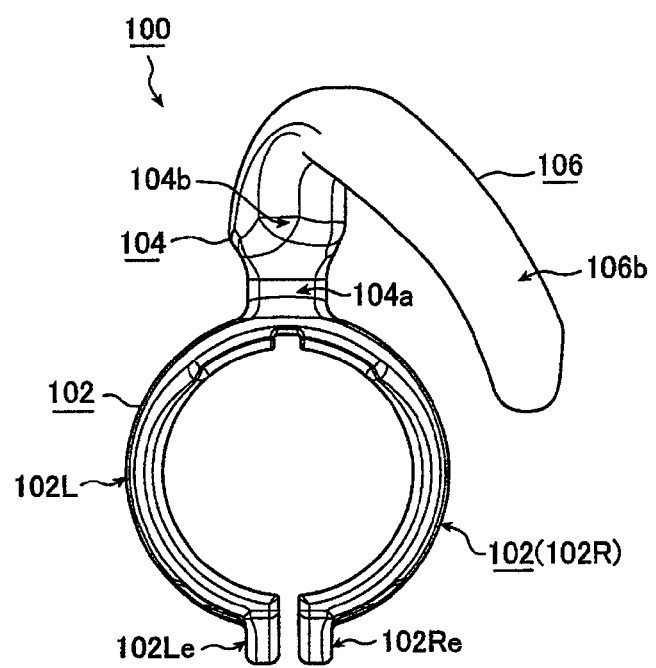
FIG. 2 shows a front view of the grip of the first embodiment as viewed from the operator side.
Figure 3:
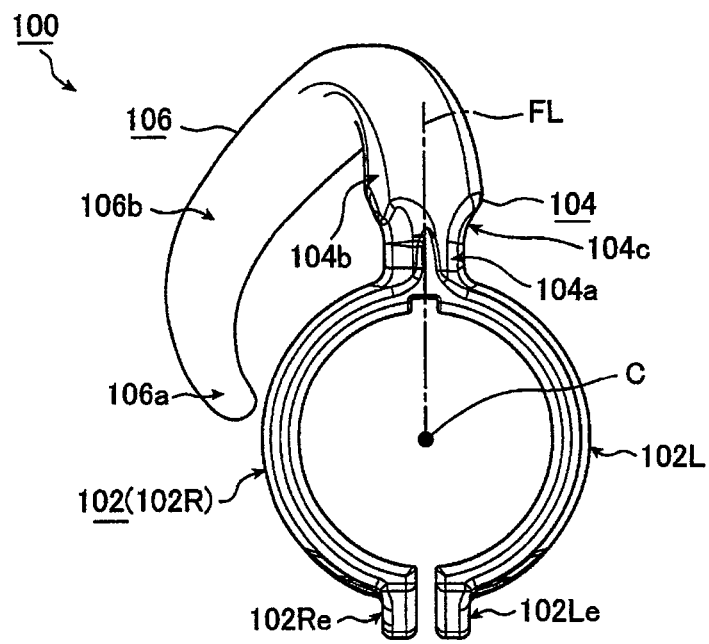
FIG. 3 shows a rear view of the grip of the first embodiment as viewed from the distal end side of an air blowing pipe.
Figure 4:
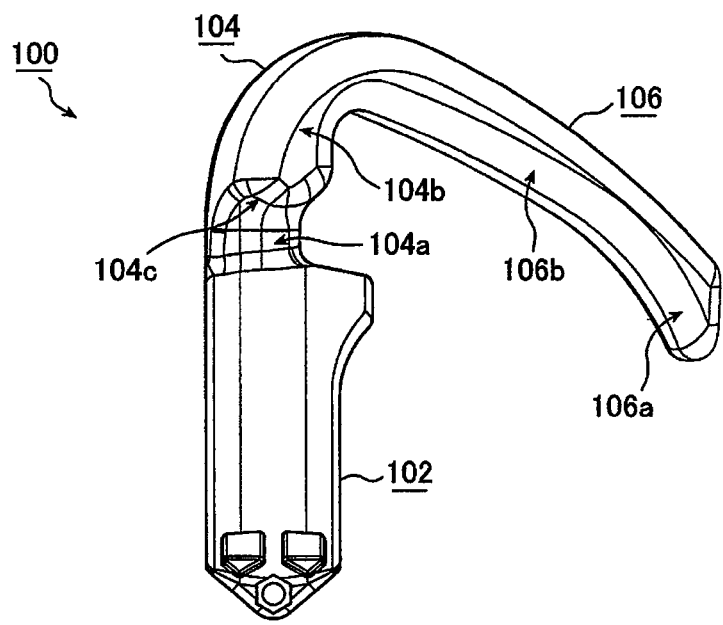
FIG. 4 shows a left side view of the grip of the first embodiment as viewed from the operator side.
Figure 5:
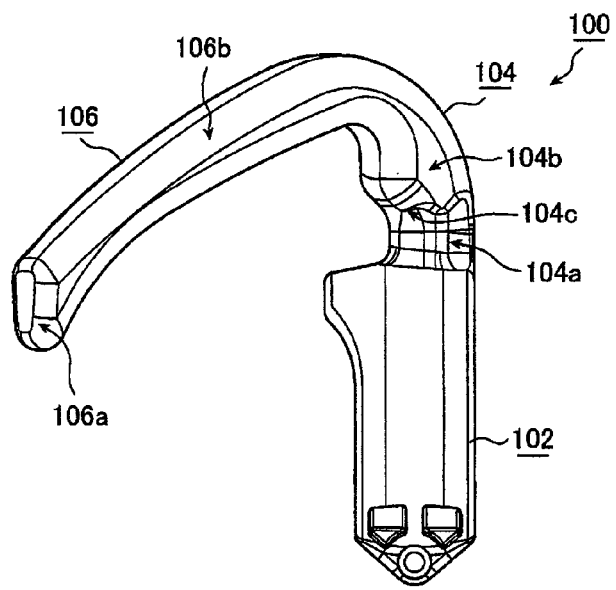
FIG. 5 shows a right side view of the grip of the first embodiment as viewed from the operator side.
Figure 6:
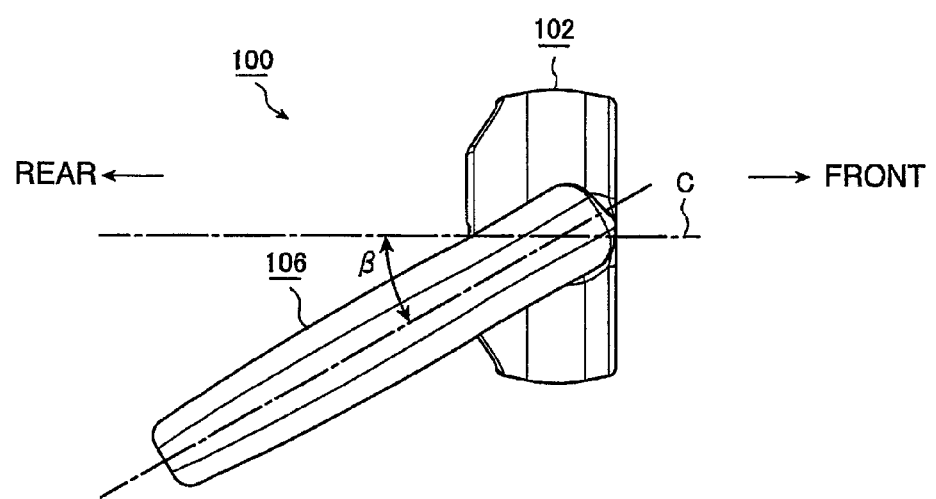
FIG. 6 shows a plan view of the grip of the first embodiment.
Figure 7:
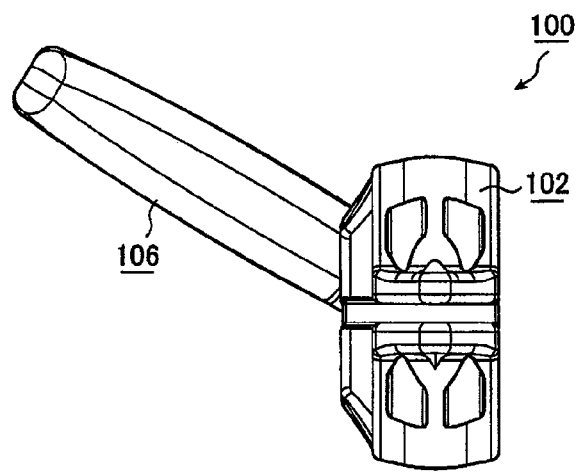
FIG. 7 shows a bottom view of the grip of the first embodiment.

FIG. 1 shows a perspective view of the grip 100 of the first embodiment as viewed from the diagonally front side. The grip 100 is made of a plastic molding. FIG. 2 shows a front view of the grip 100 as viewed from the operator side. FIG. 3 shows a rear view of the grip 100. FIG. 4 shows a left side view of the grip 100. FIG. 5 shows a right side view of the grip 100. FIG. 6 shows a plan view of the grip 100. FIG. 7 shows a bottom view of the grip 100.

The grip 100 of the first embodiment is schematically described by reference to FIGS. 1 to 7. The grip 100 includes a cylindrical base section 102 that is attached to a relatively rigid portion of the air blowing pipe 10. A proximal end of a vertical grip section 104 that extends in a direction radially separated from the base section 102 is provided continuously to the cylindrical base section 102. A distal end of a lateral grip section 106 is provided continuously to a free end of the vertical grip section 104. The lateral grip section 106 extends backward from the vertical grip section 104.

As is well understood from FIGS. 2 and 3, the cylindrical base section 102 is divided at a position opposite in a diameter direction to the vertical grip section 104. The cylindrical base section 102 has a left base section 102L and a right base section 102R. The end 102Le of the left base section 102L and the end 102Re of right base section 102R face each other. By forcibly moving these ends 102Le and 102Re closer to each other by a bolt and a nut (not shown), the base section 102 can be fixed to the air blowing pipe 10. Conversely, by loosening the bolt and the nut (not shown) to move the ends 102Le and 102Re away from each other, a front-rear position and a circumferential position of the base section 102 with respect to the air blowing pipe 10 can be adjusted. Since the configuration is well known, the detailed description is omitted.

The vertical grip section 104 extends on a virtual line FL that extends radially from a center line C of the air blowing pipe 10 (FIG. 3). A proximal end portion 104a of the vertical grip section 104, namely, a portion adjacent to the base section 102 has a shape obtained by cutting out the vertical grip section 104. As described later by reference to FIGS. 10 and 11, the proximal end portion 104a is formed into a shape and a thickness suitable to be sandwiched between a thumb and a forefinger. That is, the proximal end portion 104a is formed into a suitable thickness and round shape so that an operator may hold the proximal end portion 104a with his thumb and forefinger in a state in which his palm is placed along a peripheral surface of the air blowing pipe 10.

That is, the thickness of the proximal end portion 104a is set such that the proximal end portion 104a can be sandwiched between the thumb and the forefinger of an operator in a state in which his palm is in contact with the air blowing pipe 10. Also, a peripheral surface, particularly, a rear surface and right and left side surfaces of the proximal end portion 104a are formed into a rounded shape matching the shape of the thumb, the forefinger, and the crotch therebetween of an operator such that the operator feels no pain even when the operator tightly holds the proximal end portion 104a with the thumb, the forefinger, and the crotch between the thumb and the forefinger.

Since the proximal end portion 104a is formed into the cut-out shape, the vertical grip section 104 includes a step portion 104c (FIG. 3) between the proximal end portion 104a and an upper portion 104b above the proximal end portion 104a. The step portion 104c functions to restrict the thumb, the forefinger, and the crotch between the thumb and the forefinger engaged with the proximal end portion 104a from slipping out to the upper side. That is, the step portion 104c has a function as a stopper for the thumb, the forefinger, and the crotch between the thumb and the forefinger. The step portion 104c is also preferably formed into a rounded shape so as to soften a fit of the thumb, the forefinger, and the crotch between the thumb and the forefinger.

The upper portion 104b of the vertical grip section 104 has a thickness capable of being grasped by a hand, and its peripheral surface has a rounded shape. The vertical grip section 104 is provided continuously to the lateral grip section 106 while being gradually thinned toward the upper side and being curved backward. That is, a coupling portion between the vertical grip section 104 and the lateral grip section 106 has a rounded profile. The rounded coupling portion is also formed into a thickness and a profile convenient to be grasped by a hand.

The lateral grip section 106 has a thickness and a round peripheral profile convenient to be grasped by the hand of an operator. The lateral grip section 106 extends backward as described above. To be more specific, the lateral grip section 106 has such a length as to cover the back of the hand of an operator and further extend to a position backward of the back of the hand, for example, when the operator strongly or weakly grasps the air blowing pipe 10 in a state in which his palm is in contact with the air blowing pipe 10.

Although the lateral grip section 106 may extend substantially parallel to the air blowing pipe 10 in a longitudinal direction of the air blowing pipe 10, the lateral grip section 106 is inclined so as to gradually approach the air blowing pipe 10 as the lateral grip section 106 extends backward when viewed in side view in the present embodiment. As is best understood from FIG. 3, a rear end portion 106a of the lateral grip section 106 (a lower surface of the rear end portion 106a) has a shape curved up to a position closer to the air blowing pipe 10 than a front portion 106b when viewed in side view. In other words, the lower surface of the rear end portion 106a of the lateral grip section 106 has a shape bulging downward (FIGS. 4 and 5). Accord to this structure, it is possible to prevent the hand holding the air blowing pipe 10 from slipping out of the lateral grip section 106.

As is best understood from FIG. 6, the lateral grip section 106 extends gradually outward toward the rear side with respect to the center line C of the air blowing pipe 10 when viewed in plan view. That is, the lateral grip section 106 extends outward as the lateral grip section 106 extends backward from the vertical grip section 104 when viewed in plan view. An inclination angle of the lateral grip section 106 with respect to the air blowing pipe 10 in plan view is denoted by β (FIG. 6).

In accordance with the grip 100 described by reference to FIGS. 1 to 7, a variety of methods for grasping the grip 100, including a method of directly grasping or holding the air blowing pipe 10 to which the grip 100 is attached, can be provided. FIGS. 8 to 13 show typical specific examples.

Figure 8:
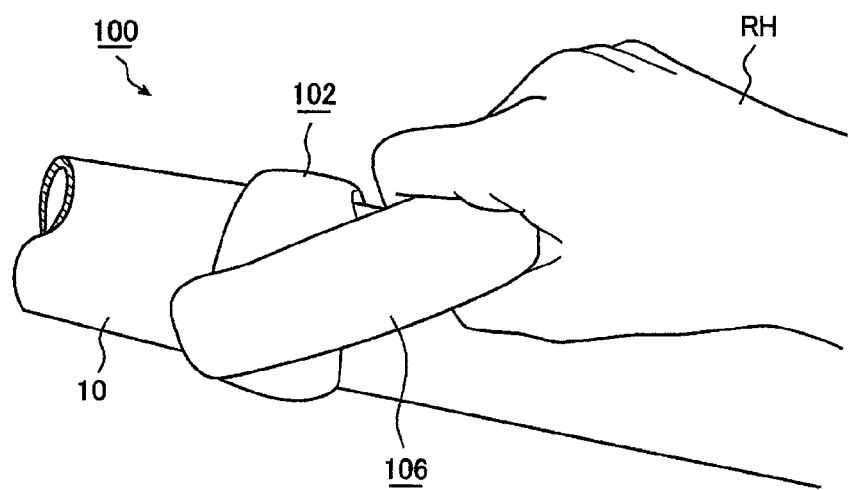
FIG. 8 shows a plan view of an example in which an operator grasps a lateral grip section.
Figure 9:
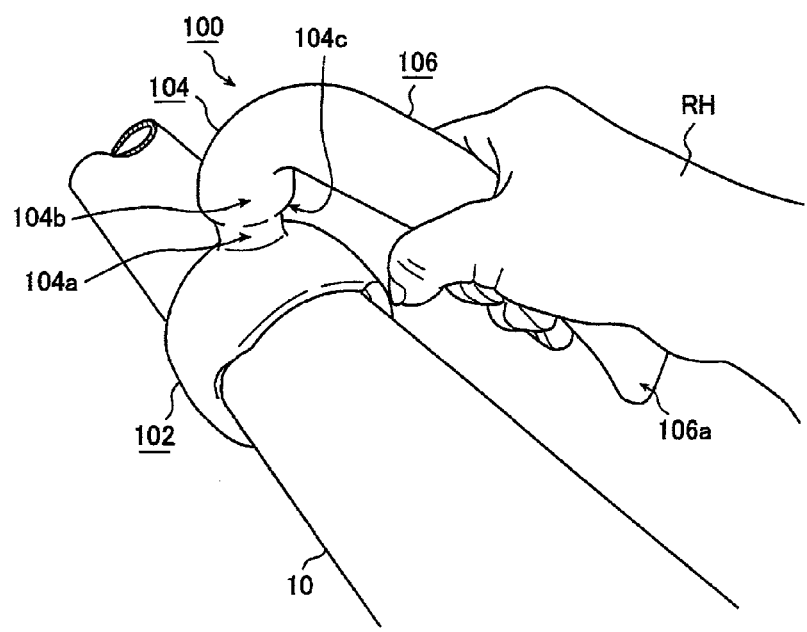
FIG. 9 is a view related to FIG. 8, and shows a perspective view as viewed from the operator side.

FIGS. 8 and 9 show an example of grasping the lateral grip section 106. In the drawings, reference character RH denotes the right hand of an operator. FIG. 8 shows a plan view. FIG. 9 shows a perspective view as viewed from the operator side (the diagonally rear side). The lateral grip section 106 has the thickness and the rounded peripheral surface convenient to be grasped by the hand. Also, since the lateral grip section 106 is inclined outward with respect to the air blowing pipe 10 (the angle β: FIG. 6) as the lateral grip section 106 extends backward from the vertical grip section 104 when viewed in plan view as described above, the operator can grasp the lateral grip section 106 while stretching the right hand in a natural form.

Figure 10:
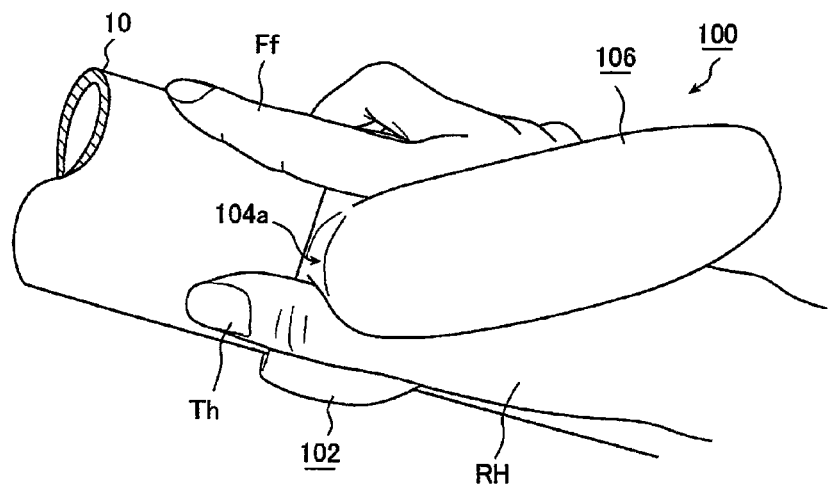
FIG. 10 shows a plan view of an example in which an operator grasps a proximal end portion of a vertical grip section with his palm in contact with the air blowing pipe.
Figure 11:
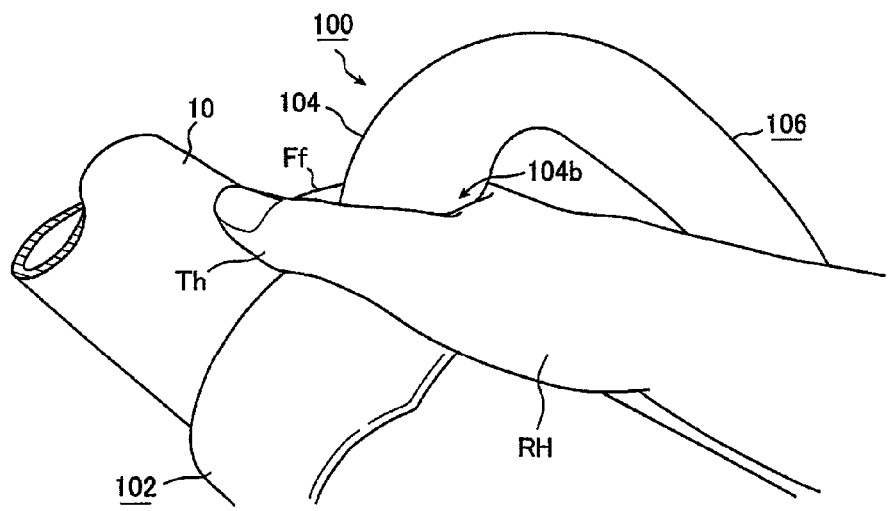
FIG. 11 is a view related to FIG. 10, and shows a perspective view as viewed from the operator side.

FIGS. 10 and 11 show a state in which the proximal end portion 104a of the vertical grip section 104 is sandwiched between a thumb Th and a forefinger Ff in a state in which the palm of the right hand RH is in contact with the air blowing pipe 10. FIG. 10 shows a plan view. FIG. 11 shows a perspective view as viewed from the operator side (the diagonally rear side). It should be understood from FIG. 11 that the thumb Th, the forefinger Ff, and the crotch portion therebetween in the above state are supported by the step portion 104c of the vertical grip section 104. Of course, a surface directed downward of the step portion 104c is preferably formed into a surface shape matching the thumb Th, preferably the forefinger Ff, and more preferably the crotch between the thumb Th and the forefinger Ff in the above state.

Figure 12:
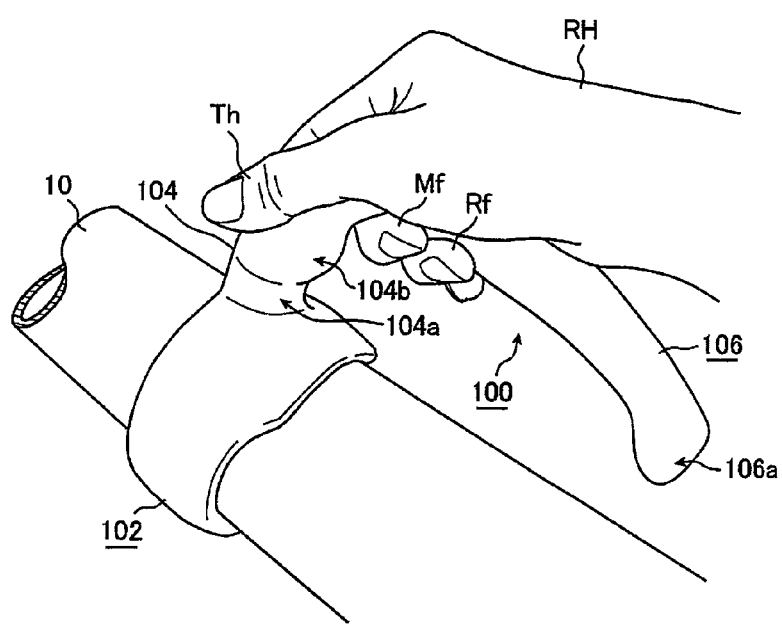
FIG. 12 shows a perspective view of an example in which an operator grasps a distal end portion of the lateral grip section as viewed from the operator side.

FIG. 12 shows a state in which the coupling portion between the vertical grip section 104 and the lateral grip section 106 is grasped or held by the base of the thumb Th, a middle finger Mf and a ring finger Rf, and the thumb Th and the forefinger Ff are in contact with the vertical grip section 104 in a stretched state. It goes without saying that the coupling portion between the vertical grip section 104 and the lateral grip section 106 is preferably formed into such a shape that each finger assumes a natural state when the grip 100 is grasped in the above state. Accordingly, it is possible to provide a gentle fit for the hand when the grip 100 is grasped in the form shown in FIG. 12.

Figure 13:
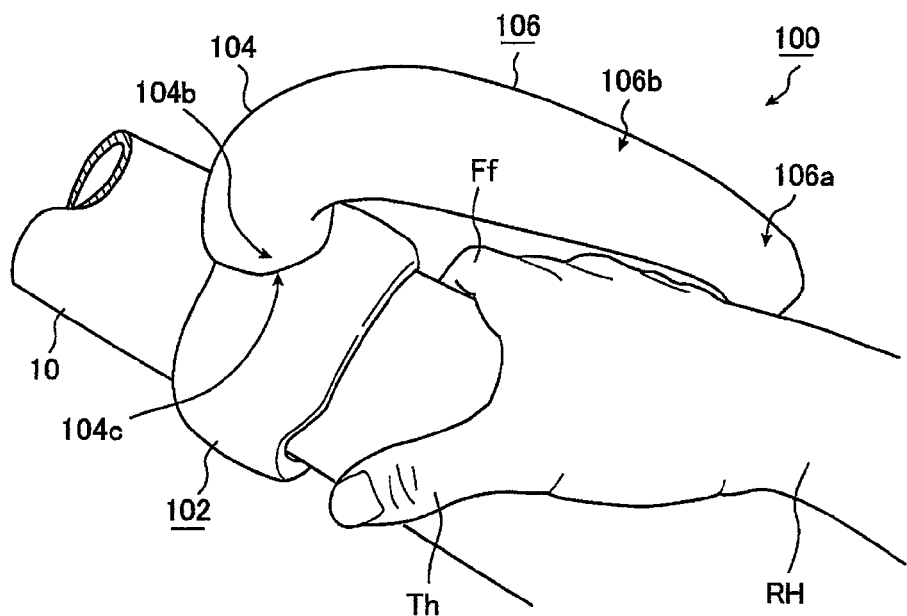
FIG. 13 shows a perspective view of an example in which an operator holds or grasps the air blowing pipe as viewed from the operator side.

FIG. 13 shows a state in which the air blowing pipe 10 is held or grasped in a state in which the palm of the right hand RH is in contact with the upper side of the air blowing pipe 10. Since the lateral grip section 106 extends backward while being inclined laterally outward as described above, the palm of the right hand RH can be brought into contact with the air blowing pipe 10 from the upper side of the air blowing pipe 10. Also, since the lateral grip section 106 is located adjacent to the back of the right hand RH holding the air blowing pipe 10, the lateral grip section 106 can prevent the right hand RH from being completely separated from the air blowing pipe 10.

Also, since the rear end portion 106a of the lateral grip section 106 has the shape bulging downward as described above (FIGS. 4 and 5), and at least the lower surface of the rear end portion 106a has the shape curved in a direction approaching the air blowing pipe 10 up to a position closer to the air blowing pipe 10 than the front portion 106b, the rear end portion 106a can prevent the right hand RH from slipping out to the upper side and the rear side as is well understood from FIG. 13.

Although the above grasping methods are merely examples, it should be easily understood from the above examples that a variety of methods for grasping the grip 100, including the method of directly holding the air blowing pipe 10, can be provided by the grip 100 of the first embodiment.

Figure 14:
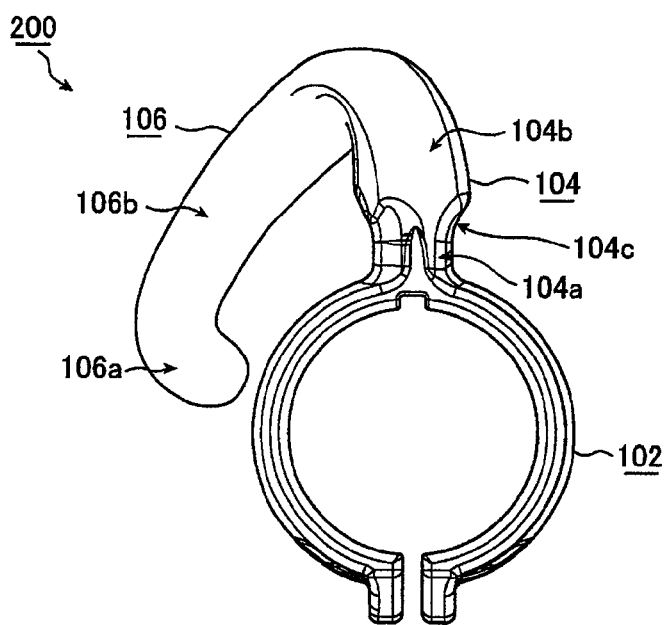
FIG. 14 shows a rear view of a grip of a second embodiment, corresponding to FIG. 3 in the first embodiment.
Figure 15:
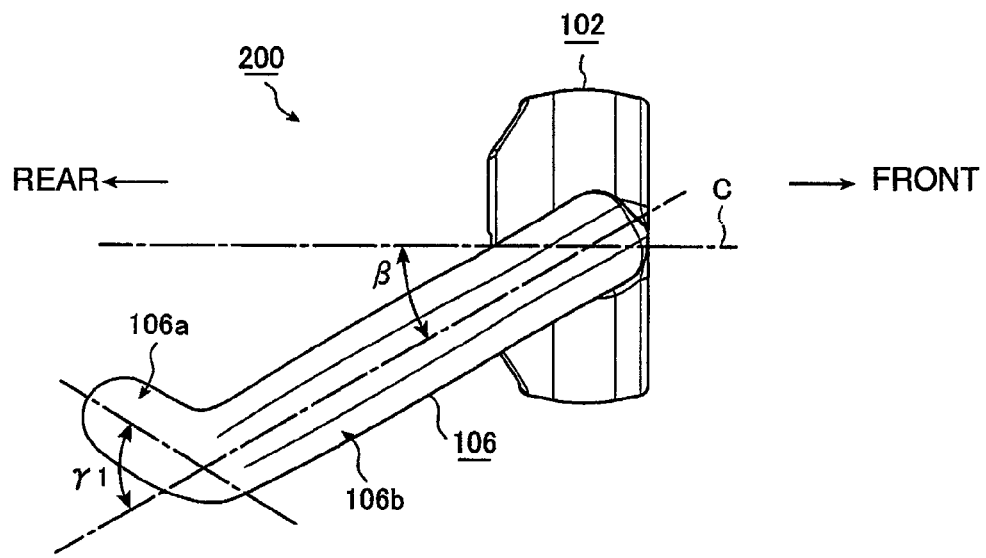
FIG. 15 shows a plan view of the grip of the second embodiment, corresponding to FIG. 6 in the first embodiment.
Figure 16:
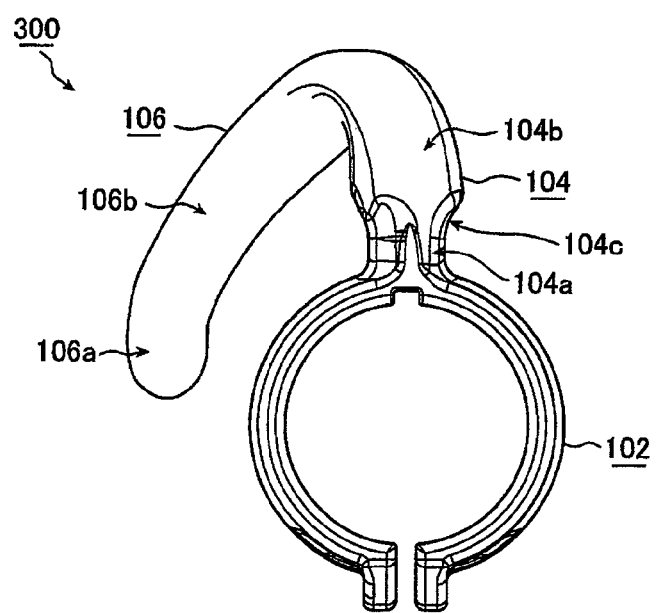
FIG. 16 shows a rear view of a grip of a third embodiment, corresponding to FIG. 3 in the first embodiment.
Figure 17:
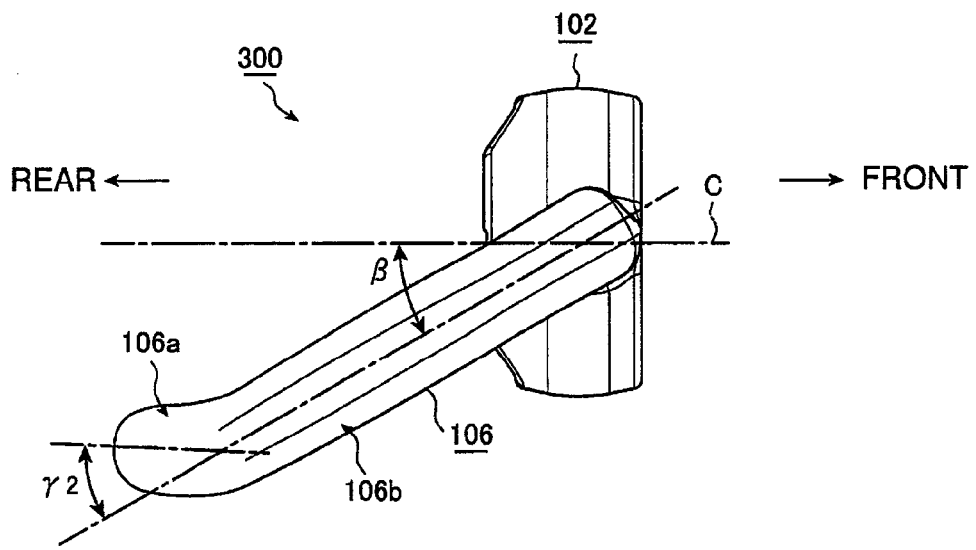
FIG. 17 shows a plan view of the grip of the third embodiment, corresponding to FIG. 6 in the first embodiment.

Second and Third Embodiments (FIGS. 14 to 17):

FIGS. 14 and 15 show a grip 200 of a second embodiment. FIGS. 16 and 17 show a grip 300 of a third embodiment. The grips 200 and 300 of the second and third embodiments are also modifications of the grip 100 of the first embodiment described above. Therefore, in the description of the grips 200 and 300 of the second and third embodiments, the detailed description is omitted by assigning the same reference numerals to the same elements as those of the first embodiment. Characteristic portions of the grips 200 and 300 of the second and third embodiments are described below.

When viewed in plan view, the lateral grip section 106 is inclined backward and outward from the vertical grip section 104 similarly to the grip 100 of the first embodiment described above (FIG. 6). The inclination angle of the lateral grip section 106 is denoted by β (FIGS. 15 and 17).

In the grips 200 and 300 of the second and third embodiments, the rear end portion 106a of the lateral grip section 106 has a shape gradually approaching the air blowing pipe 10 when viewed in plan view. In other words, the rear end portion 106a of the lateral grip section 106 has a shape curved or bent toward the air blowing pipe 10. In a case of using the term "bend" for describing the shape, a bend angle of the grip 200 of the second embodiment is denoted by "γ1" in FIG. 15, and a bend angle of the grip 300 of the third embodiment is denoted by "γ2" in FIG. 17. When the grip 200 of the second embodiment and the grip 300 of the third embodiment are compared, the grip 200 of the second embodiment has a larger bend angle y than that of the grip 300 of the third embodiment (γ1>γ2).

In the grips 200 and 300 of the second and third embodiments, the rear end portion 106a of the lateral grip section 106 has the shape gradually approaching the air blowing pipe 10 when viewed in plan view. Thus, it is possible to prevent the right hand RH located between the front portion 106b of the lateral grip section 106 and the air blowing pipe 10 (particularly in a state in which the right hand RH is in contact with the air blowing pipe 10 as shown in FIG. 13) from slipping out of a space between the lateral grip section 106 and the air blowing pipe 10.

Of course, in the lateral grip section 106 of the grips 200 and 300 of the second and third embodiments, at least the lower surface of the rear end portion 106a may have a shape approaching the air blowing pipe 10 when viewed in side view similarly to the first embodiment (FIGS. 4 and 5).

While the invention has been described with reference to the specific exemplary embodiment, it will be apparent to those skilled in the art that various changes and modifications can be made to the specific embodiments without departing from the spirit and scope of the invention as defined in the claims.

4: Blower body
10: Air blowing pipe
100: Grip of the embodiment
102: Cylindrical base section
C: Center line of the air blowing pipe
104: Vertical grip section
104a: Proximal end portion of the vertical grip section
104b: Upper portion above the proximal end portion of the vertical grip section
104c: Step portion between the proximal end portion and the upper portion
106: Lateral grip section
106a: Rear end portion of the lateral grip section
106b: Front portion forward of the rear end portion of the lateral grip section
RH: Right hand
Th: Thumb
Ff: Forefinger
Mf: Middle finger
Rf: Ring finger

What is claimed is:

1. A grip for a backpack-type air blowing machine which performs a work by using air discharged from a distal end of an air blowing pipe that is coupled to a blower body driven by a power source while the air blowing pipe is manipulated by an operator with the power source and the blower body being carried on a back of the operator, comprising:
   a base section that constitutes an attachable section to an air blowing pipe of a backpack-type air blowing machine;
   a vertical grip section that is provided with a proximal end portion provided continuously to the base section; and
   a lateral grip section that is provided continuously to a free end of the vertical section and extends in a direction apart laterally from the vertical grip section,
   wherein the proximal end portion of the vertical grip section has a shape with a thickness capable of being sandwiched between a thumb and a forefinger of the operator, and
   the vertical grip section further includes an upper portion above and thicker than the proximal end portion and a step portion between the proximal end portion and the upper portion, wherein the step portion is configured to restrict a thumb, forefinger, and crotch between the thumb and the forefinger engaged with the proximal end portion from slipping out to the upper portion.

2. The grip for a backpack-type air blowing machine of claim 1, wherein the step portion is formed into a rounded shape.

3. The grip for a backpack-type air blowing machine of claim 2, wherein the lateral grip section is inclined outward when viewed in a top plan view of the grip.

4. The grip for a backpack-type air blowing machine of claim 3, wherein a rear end portion of the lateral grip section has a downward curved or bent shape.

5. The grip for a backpack-type air blowing machine of claim 1, wherein the lateral grip section is inclined outward when viewed in a top plan view of the grip.

6. The grip for a backpack-type air blowing machine of claim 5, wherein a rear end portion of the lateral grip section has a downward curved or bent shape.

7. The grip for a backpack-type air blowing machine of claim 1, wherein the vertical grip section has a shape gradually curved backward as is apart from the proximal end portion when viewed in a left or right side view of the grip.

8. The grip for a backpack-type air blowing machine of claim 7, wherein a coupling portion between the vertical grip section and the lateral grip section has a rounded profile.

9. The grip for a backpack-type air blowing machine of claim 1, wherein the lateral grip section has a rear end portion, a lower surface of the rear end portion is curved downward.

10. The grip for a backpack-type air blowing machine of claim 9, wherein the rear end portion of the lateral grip section has a free end.

* * * * *